United States Patent
Anton et al.

(10) Patent No.: US 8,990,784 B2
(45) Date of Patent: Mar. 24, 2015

(54) DETERMINING CONTROL FLOW DIVERGENCE DUE TO VARIABLE VALUE DIFFERENCE

(71) Applicant: International Business Machines Corporation, Armonk, NY (US)

(72) Inventors: Krzysztof Anton, Brzozow (PL);
Michal Bodziony, Tegoborze (PL);
Pawel K. Koperek, Krakow (PL); Rafal Korczyk, Bielsko-Biala (PL)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 13/929,898

(22) Filed: Jun. 28, 2013

(65) Prior Publication Data
US 2015/0007147 A1    Jan. 1, 2015

(51) Int. Cl.
*G06F 9/44* (2006.01)
*G06F 11/36* (2006.01)
*G06F 11/34* (2006.01)

(52) U.S. Cl.
CPC .............. *G06F 11/362* (2013.01); *G06F 8/20* (2013.01); *G06F 11/3466* (2013.01)
USPC .......................................... 717/131; 717/132

(58) Field of Classification Search
CPC ................................ G06F 11/3466; G06F 8/20
USPC ................................................ 717/131, 132
See application file for complete search history.

(56) References Cited

U.S. PATENT DOCUMENTS 5,889,986 A * 3/1999 Nguyen et al. ................ 712/237
6,957,421 B2  10/2005 Hundt et al.
(Continued)

FOREIGN PATENT DOCUMENTS

EP         1145125 B1    8/2004

OTHER PUBLICATIONS

Tim-Arduino for Visual Studio, "Debugger—Change the Values of Variables on a Running Arduino", DIY Drones, Posted Nov. 12, 2012, Accessed Apr. 19, 2013, © 2013 Created by Chris Anderson. diydrones.com/profiles/blogs/debugger-change-the-values-of-variables-on-a-running-arduino.

(Continued)

*Primary Examiner* — Phillip H Nguyen
(74) *Attorney, Agent, or Firm* — Richard A. Wilhelm; Sirpa Kuisma

(57) ABSTRACT

An embodiment is directed to a method for analyzing a computer program that includes receiving an instruction specifying a first variable of the program. The first variable has a first value at a first location during program execution. The instruction further specifies a second value for the first variable at the first location. The method includes determining that a second location during program execution includes a conditional control flow instruction that includes the first variable. In addition, the method includes evaluating the conditional control flow instruction using the first and second values of the first variable at the second location. It may be determined whether control flow diverges at the second location based on the evaluating of the conditional control flow instruction using the first and second values at the second location.

18 Claims, 8 Drawing Sheets

(56) References Cited

U.S. PATENT DOCUMENTS

| | | | |
|---|---|---|---|
| 7,664,939 B2 * | 2/2010 | Endo et al. | 712/220 |
| 7,739,664 B2 | 6/2010 | Bates et al. | |
| 8,091,075 B2 | 1/2012 | Bates et al. | |
| 8,245,196 B2 | 8/2012 | Kaga | |
| 8,307,346 B2 | 11/2012 | Lev et al. | |
| 8,429,635 B2 | 4/2013 | Branda et al. | |
| 8,533,685 B2 * | 9/2013 | Horley et al. | 717/128 |
| 2006/0168433 A1 * | 7/2006 | Dash | 712/241 |
| 2012/0110553 A1 | 5/2012 | Bates et al. | |

OTHER PUBLICATIONS

"Tutorial—Eclipse: Advanced Debugging", Victoria University of Wellington, School of Engineering and Computer Science, Accessed Apr. 19, 2013, last updates Jan. 31, 2011, © Victoria University of Wellington, New Zealand. ecs.victoria.ac.nz/Support/EclipseAdvancedDebugging.

Anton et al., "Determining Control Flow Divergence Due to Variable Value Difference," U.S. Appl. No. 14/488,543, filed Sep. 17, 2014.

* cited by examiner

```
1  Public static void main ( String[] args) {
2      long base = 10, exp = 5, result = 1;
3      System.out.println ("values initialized");
4      for (int i=0; i<exp; i++) {
5          result *= base;
6      }
7      if (result > 1000000) {
8          System.out.println ("More than million");
9      } else {
10         System.out.println ("Less than million");
11     }
12 }
```

FIG. 5

```
1   public static void main ( String[] args) {
2       long base = 10, exp = 5, result = 1;
3       System.out.println ("values initialized");
4       for (int i=0; i<exp; i++) {
5           result *= base;
6       }
7       result = 9999;
8       if (result > 1000000) {
9           System.out.println ("More than million");
10      } else {
11          System.out.println ("Less than million");
12      }
13  }
```

FIG. 6

DETERMINING CONTROL FLOW DIVERGENCE DUE TO VARIABLE VALUE DIFFERENCE

BACKGROUND

This disclosure relates generally to data processing, and more particularly, to software development, including techniques for facilitating debugging a computer program.

The development of a computer program includes creating source code, which may include many thousands of lines of instructions. The source code is converted into an executable program or machine code using a compiler. A software application typically includes a collection of programs that perform particular tasks.

Computer programs, especially new ones, typically contain errors, commonly referred to as "bugs." Debugging involves testing and evaluating the computer program to find and correct errors. A programmer may use a computer program, commonly referred to as a "debugger" to assist in debugging a program.

A group of computer program instructions, while being executed, may be referred to as a "process." Several processes may be associated with a program while it is running. A process may include two or more threads. A thread is the smallest set of instructions that can be managed independently by an operating system scheduler. Threads within the same process may share resources and context, e.g., memory, instructions, and variable values, while threads of different processes do not share resources.

A debugger allows the programmer to execute a computer program under the control of the debugger, allowing a process to be monitored. The order in which instructions are executed and values that variables are changed to may be tracked during program execution. Among other features, debuggers typically support breakpoint and step operations. A "breakpoint" function permits a programmer to set a breakpoint at a particular instruction or line. Program instructions are executed until the instruction with the breakpoint is reached. Execution of the program is paused at the instruction immediately preceding the breakpoint instruction and the values of variables at the breakpoint instruction may be presented to the programmer for analysis. A "step" function permits a programmer to execute instructions of a computer program one at a time and view values of variables at the completion of each instruction.

Typically, it is not practical to step through many thousands of lines of instructions of a program from beginning to end using the step function. Commonly, a programmer will set a breakpoint at a particular instruction and once the breakpoint is reached, the step function is then used to step through a few of the lines immediately following the breakpoint.

SUMMARY

An embodiment is directed to a method for analyzing a computer program. The method includes receiving an instruction specifying a first variable of the program. The first variable has a first value at a first location during program execution. The instruction further specifies a second value for the first variable at the first location. The method includes determining that a second location during program execution includes a conditional control flow instruction that includes the first variable. In addition, the method includes evaluating the conditional control flow instruction using the first and second values of the first variable at the second location. It may be determined whether control flow diverges at the second location based on the evaluating of the conditional control flow instruction using the first and second values at the second location.

Another embodiment is directed to a system for analyzing a computer program.

Yet another embodiment is directed to a method for analyzing a computer program. The method may include receiving an instruction specifying a first variable of the program. The first variable has a first value at a first location during program execution. The instruction further specifies a second value for the first variable at the first location. A first instance of the computer program is executed from the first location using the first value of the first variable. In addition, a second instance of the computer program is executed from the first location using the second value of the first variable. It is determined that a second location during program execution includes a conditional control flow instruction that includes the first variable. Further, it is determined whether the conditional control flow instructions of the first and second instances are evaluated equivalently by the first and second instances of the computer program. Moreover, it is determined that control flow diverges at the second location based on the determining of whether the conditional control flow instructions are evaluated by equivalently by the first and second instances of the computer program. The executing of the program instances may be paused in response to the determining that control flow diverges at the second location.

BRIEF DESCRIPTION OF THE DRAWINGS

FIG. 5 shows a first example of a portion of computer program source code.

FIG. 6 shows a second example of a portion of computer program source code.

In the Figures and the Detailed Description, like numbers refer to like elements.

DETAILED DESCRIPTION

Debugging a software application can be a complex problem. The application may operate correctly when a variable has a particular value at some point during program execution. However, when the same variable has a different value at the same point, the application may operate incorrectly. Debugging may require observing the behavior of a particular portion of code with different values of variables. Using a debugger, the programmer can set a breakpoint at a particular instruction and after the process is stopped, change the value of a variable. The programmer can then restart the process or execute the code step by step. In some situations, it may still be difficult to determine the impact of changing a variable value, because the change has its impact only at some point in the code far removed from the location where the variable was changed. It is generally not practical or efficient to step through many thousands of lines of instructions following a breakpoint to determine where the change has its impacts the process.

The control flow of a program (the order in which the individual instructions of a program are executed) may be different for different values of a particular variable at some point or location during the program execution. This point or location may be an instruction that is far removed from where the value of the variable is changed. It can be time consuming to execute a process step by step from the point where a programmer changes a value of a variable to determine where a change in the flow of program execution occurs as a result of the value change.

In various embodiments, a program is run under the control of a debugger. Execution of the program may be paused at a particular location. For example, a breakpoint may be used to pause execution of the program. Once paused, the values of variables at the point of execution may be displayed. The programmer may select one or more of the variables of the program. For example, the programmer may specify a first variable. The first variable has a first value at the paused location during program execution. The programmer also specifies a second value for the first variable. The programmer then chooses a "run into flow split" option in the debugger and program execution under the control of the debugger is resumed. When this option is invoked a number of determinations may be made and a number of operations may be performed before each line is executed. These determinations and operations include identifying a second location during program execution that includes a conditional control flow instruction. When a conditional control flow instruction is encountered, it is evaluated using the first value. In addition, the conditional control flow instruction is evaluated using the second value. It may be then determined whether control flow diverges at the second location based on the evaluations of the conditional control flow instruction using the first and second values.

Figure 1:
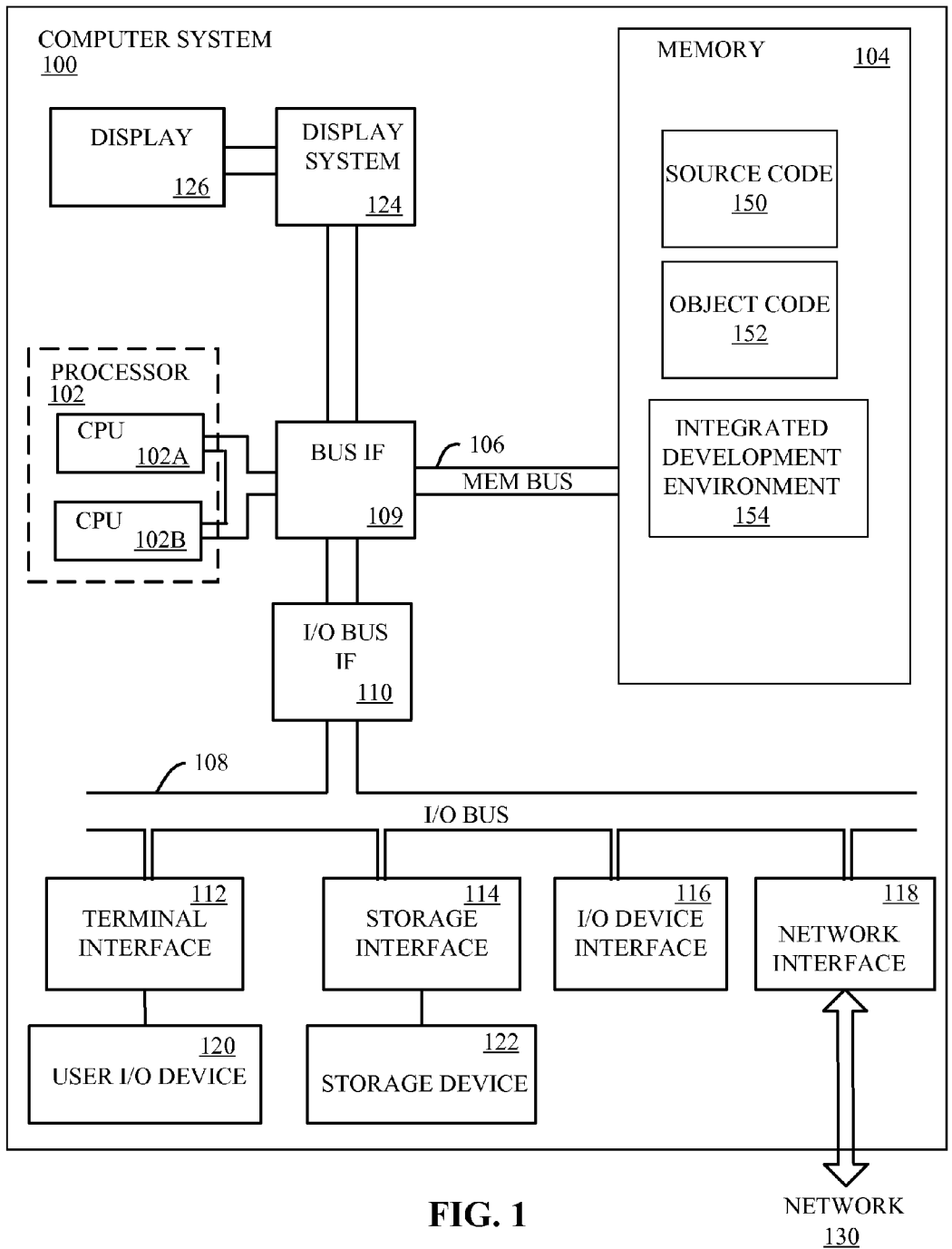
FIG. 1 is a schematic block diagram illustrating an embodiment of a computer system.

FIG. 1 is a schematic block diagram illustrating one embodiment of a computer system 100. The computer system 100 is one exemplary context in which embodiments may be implemented. The mechanisms and apparatus of the various embodiments disclosed herein apply equally to any appropriate computing system. The major components of the computer system 100 include one or more processors 102, a memory 104, a terminal interface 112, a storage interface 114, an Input/Output ("I/O") device interface 116, and a network interface 118, all of which are communicatively coupled, directly or indirectly, for inter-component communication via a memory bus 106, an I/O bus 108, bus interface unit ("IF") 109, and an I/O bus interface unit 110.

The computer system 100 may contain one or more general-purpose programmable central processing units (CPUs) 102A and 102B, herein generically referred to as the processor 102. In an embodiment, the computer system 100 may contain multiple processors; however, in another embodiment, the computer system 100 may alternatively be a single CPU system. Each processor 102 executes instructions stored in the memory 104 and may include one or more levels of on-board cache.

In an embodiment, the memory 104 may include a random-access semiconductor memory, storage device, or storage medium (either volatile or non-volatile) for storing or encoding data and programs. In another embodiment, the memory 104 represents the entire virtual memory of the computer system 100, and may also include the virtual memory of other computer systems coupled to the computer system 100 or connected via a network 130. The memory 104 is conceptually a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the following: source code 150, object code 152, and an integrated development environment ("IDE") 154. These programs and data structures are illustrated as being included within the memory 104 in the computer system 100, however, in other embodiments, some or all of them may be on different computer systems and may be accessed remotely, e.g., via a network 130. The computer system 100 may use virtual addressing mechanisms that allow the programs of the computer system 100 to behave as if they only have access to a large, single storage entity instead of access to multiple, smaller storage entities. Thus, while the source code 150, object code 152, and IDE 154 are illustrated as being included within the memory 104, these components are not necessarily all completely contained in the same storage device at the same time. Further, although the source code 150, object code 152, and IDE 154 are illustrated as being separate entities, in other embodiments some of them, portions of some of them, or all of them may be packaged together.

In an embodiment, the source code 150, object code 152, and IDE may include instructions or statements that execute on the processor 102 or instructions or statements that are interpreted by instructions or statements that execute on the processor 102 to carry out the functions as further described below. In another embodiment, the IDE may be implemented in hardware via semiconductor devices, chips, logical gates, circuits, circuit cards, and/or other physical hardware devices in lieu of, or in addition to, a processor-based system. In an embodiment, the source code 150, object code 152, and IDE 154 may include data in addition to instructions or statements.

The source code 150 may include a textual representation of the instructions or statements of one or more computer programs. The object code 152 may include executable instructions or statements corresponding with the source code 150. The IDE 154 may include various components described in this disclosure for producing executable computer programming code.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In an embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 is intended to depict the representative major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
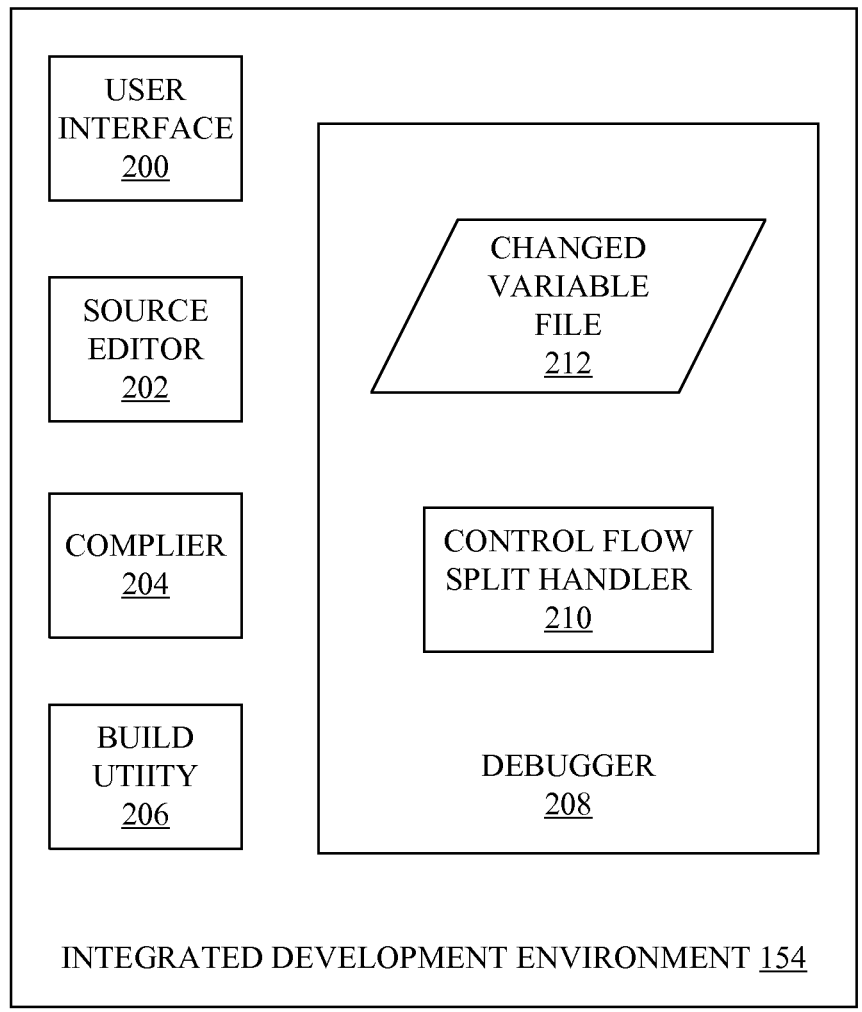
FIG. 2 is a schematic block diagram illustrating an integrated development environment for producing executable computer programming code according to various embodiments.

FIG. 2 is a schematic block diagram illustrating the IDE 154 for producing executable computer programming code according to various embodiments. The IDE 154 may include a user interface 200, source editor 202, compiler 204, build utility 206, and debugger 208.

User interface 200 may be a graphical user interface with one or more windows that allow a programmer to view source code, variable values, directories, command menus, and the like. The user interface 200 allows a programmer to view and change the value of one or more variables and to invoke a function to determine where control flow splits based on a new and original value for a variable.

Source editor 202 is an executable computer program which supports the creation and editing of source code 150 for other computer programs, using any of various known techniques. Source editor 202 may be a general-purpose free-form text editor for editing text files, which is non-specific to a programming language, or may a special-purpose source editor for one or more programming languages.

Compiler 204 is an executable program which converts source code 150 to corresponding files into corresponding object code 152. Build utility 206 is an executable computer program which builds a program by incorporating or binding multiple object code modules.

Debugger 208 is an executable program which is used to assist the programmer in analyzing executable computer programming code for defects. Debugger may provide the programmer with various functions, as are known in the art. In accordance with various embodiments, debugger 208 includes a control flow split handler 210 for determining control flow split points during execution of a program under alternate values of one or more program variables. In addition, debugger 208 may include a changed variable file 212.

Control flow split handler 210 is an executable run-time routine which is invoked when the programmer chooses a "run into flow split" option in the debugger 208. In various embodiments, the Control flow split handler 210 evaluates each instruction before it is executed to determine a second location in the program where control flow diverges based on the particular value of a variable at a first location. That is, for at least one value of the variable, control flows on a first path from the second location, while for at least one other value of the variable, control flows on a second path from the second location. In other words, the Control flow split handler 210 determines whether control flow diverges at the second location based on different values of the variable at the first location.

Although a user interface 200, source editor 202, compiler 204, build utility 206, and debugger 208 are shown as part of an integrated application development environment 154 in FIG. 2, they may be provided as separate entities in alternative embodiments. Although control flow split handler 210 is shown as an executable routine within debugger 208, control flow split handler might be a separate routine or might be contained within some other program. Furthermore, although functional modules 202-208 are depicted in FIG. 2 on a single computer system 100 for completeness of the representation, it is not necessarily true that all functions will be present on a single computer system or will be performed on a single computer system. For example, editing of source code may be performed by source editors located in a distributed manner in individual workstations, while compiling, building and analysis of code might be performed by a centralized server.

Figure 3:
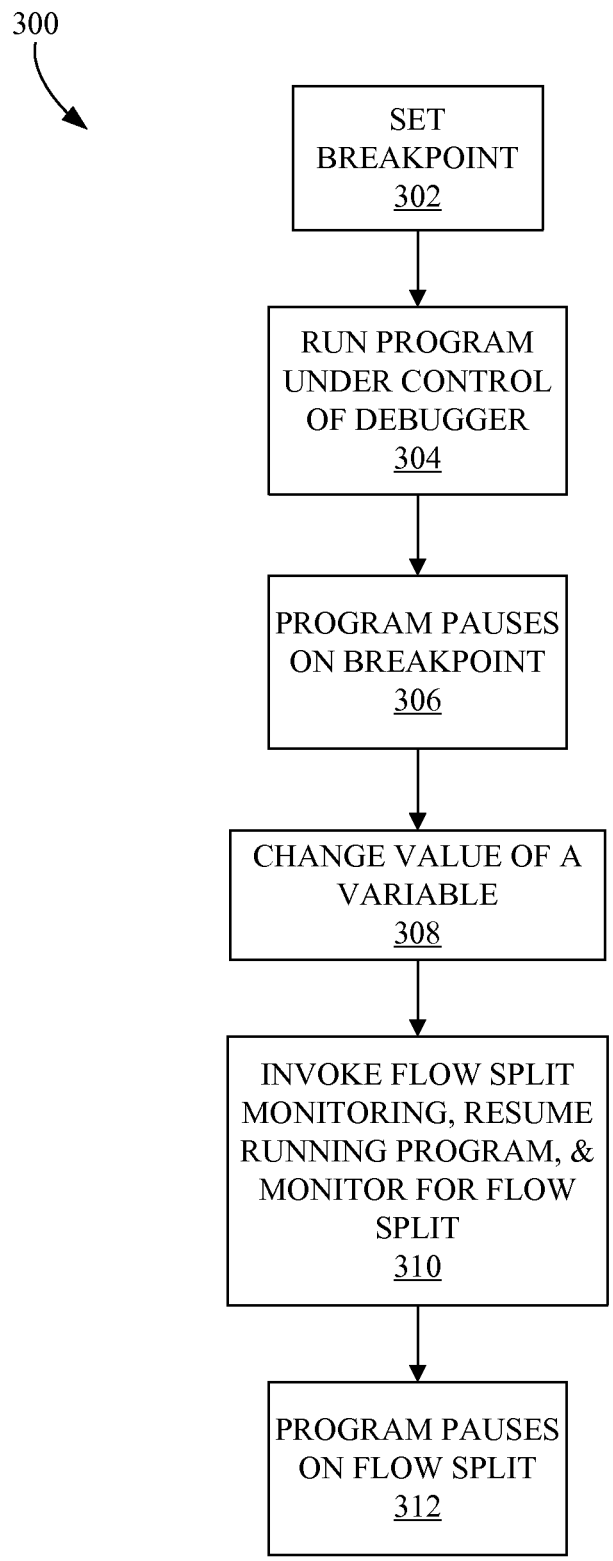
FIG. 3 is a high-level flow diagram showing one aspect of developing a computer program using an integrated development environment according to various embodiments.

FIG. 3 is a high-level flow diagram showing one aspect of developing a computer program using the integrated development environment 154 according to various embodiments. In particular, developing a program may involve debugging the program. One debugging activity may be determining the location where control flow diverges based on the value of a program variable. FIG. 3 illustrates a process 300 determining the location where control flow diverges based on a changed value of a variable.

A programmer may set a breakpoint at a desired location in a computer program (step 302). For example, the programmer may set a break point at the beginning of a section of code that is suspected to have a bug. The programmer may then issue a command to a component of the IDE 154 that causes the computer program to run under the control of the debugger 208 (step 304). The computer program runs until the instruction associated with the breakpoint is reached. The computer program pauses when the breakpoint is reached (step 306). When the program pauses, the values of program variables at that stage of program execution may be displayed in the user interface 200. At step 308, the programmer may change at least one of the program variables. In various embodiments, the programmer may change two or more variables. In step 310, the programmer invokes flow split monitoring and issues a command that causes the computer program to resume running under the control of the debugger from the point where execution was paused. The program is executed from this point using an automated flow split monitoring process in accordance with the principles disclosed in this disclosure. Under this process, the program executes normally until a location in the code is found where control flow diverges based on different values for the variable (or variables) changed in step 308. (Control flow diverges if the next instruction is at a location for the changed value of the variable that is different from the location for the unchanged value of the variable.) In step 312, the program is automatically paused at the instruction before the control flow split according to various embodiments.

Figure 4A:
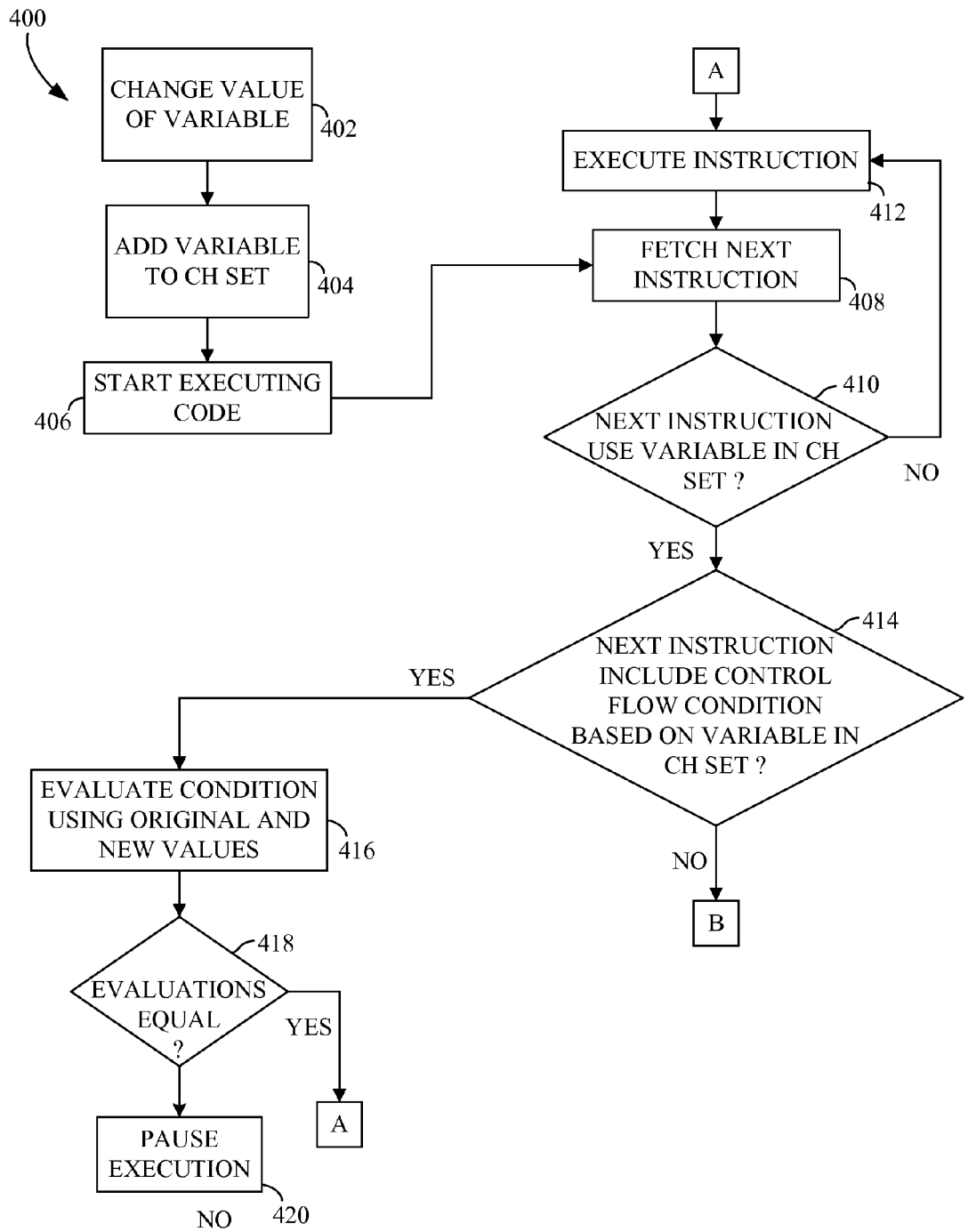
FIGS. 4A and 4B are a flow chart of an embodiment of a process for determining a location in a computer program where control flow diverges based on different values of a variable.
Figure 4B:
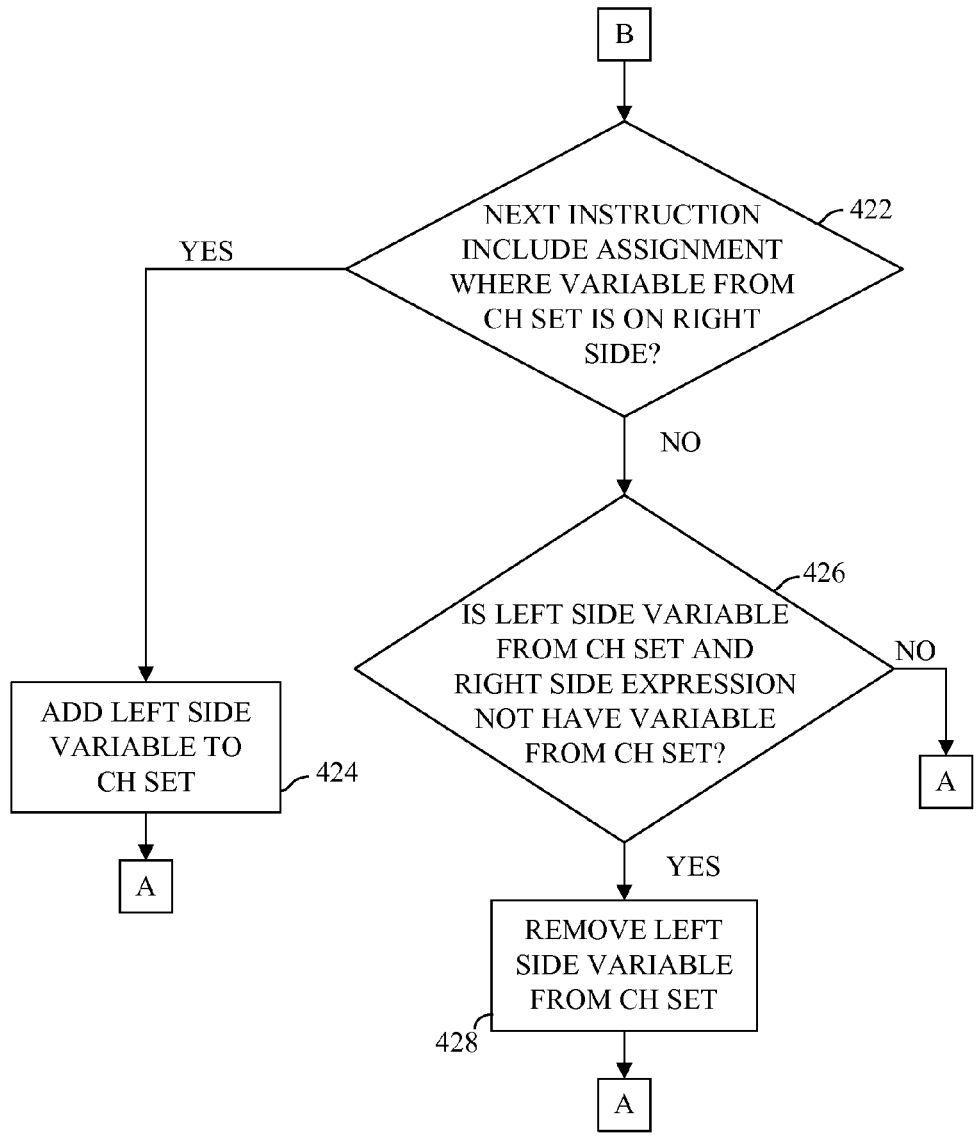

FIGS. 4A and 4B together show a flow chart of an embodiment of a process 400 for determining a location in a computer program where control flow diverges based on different values of a variable. As mentioned, a programmer may set a breakpoint at chosen line of computer program code and run the program under the control of the debugger until the program pauses at the breakpoint, however, this may not be required in every embodiment. The process 400 may begin with the programmer changing value of one or more variables at step 402. In one alternative, a variable value may be changed at a particular point in program execution by an automated process. Each variable that is changed is added to changed variable file 212, which may be referred to in this document as a "CH set" (step 404). When a variable is added to the CH set, two values are stored. The original value of the variable before the change and the new value after the change are stored in the changed variable file 212. In addition, the values stored in the changed variable file 212 in step 404 may be updated if the value of a variable changes during the course of program execution. In step 406, execution of the program continues and a next instruction is fetched in step 408.

Before each next instruction is executed, several determinations may be made. In step 410, the control flow split handler 210 may determine whether the next instruction uses a variable in the CH set. The CH set includes the variable (or variables) changed by the programmer. In addition, as described below, the CH set stored in the changed variable file 212 may also include additional program variables. For example, the process 400 may add a variable to the CH set if it determines that the variable is "sourced" from another variable in the CH set. If the instruction does not use a variable in the CH set, the instruction is executed in step 412 and the process 400 moves on to the next instruction. On the other hand, if the instruction does uses a variable in the CH set, the instruction is analyzed in step 414 to determine whether it includes a control flow condition that is a based on a variable in the CH set.

A control flow condition may be included in a variety of different instructions and programming constructs. A control flow condition is a condition that causes a different next instruction to be selected depending on whether the condition is satisfied. A control flow condition may include more than one condition and more than two possible next instructions. Some examples include a conditional branch instruction, if-go-to construct, if-then construct, if-then-else construct, switch or case statements, and while and do-while loops.

In step 414, the control flow split handler 210 may determine whether the next instruction includes a control flow condition that is a based on a variable in the CH set. If the instruction includes a control flow condition that is a based on a variable in the CH set, the instruction is evaluated in step 416. The instruction is evaluated for both the original value of the variable before it was changed and the new value after the change in step 416. After the instruction is evaluated for both versions of the variable, the results are compared in step 418. If the condition evaluates the same way for both versions of the variable, the instruction is executed in step 412 and the process 400 moves on to the next instruction in step 408. On the other hand, if the condition does not evaluate the same way for both versions of the variable, the program is paused in step 420. The program is paused because a location in the computer program where control flow diverges based on different values of a variable has been found. A suitable message may be displayed in the user interface 200.

As one example of determining whether a condition evaluates the same way for both versions of the variable, consider a conditional branch instruction in which a statement on line 10 is the next statement if the variable value is less than 5 and a statement on line 20 is the next statement if the variable value is 5 or more. When the original and new values of the variable are both less than 5, the condition evaluates the same way (line 10 is the next statement) for both versions of the variable in step 418. On the other hand, if the original value of the variable is less than 5 and the new value of the variable is greater than 5, the condition evaluates differently for the original value (line 10 is the next statement) as compared with the new value (line 20 is the next statement). Accordingly, there will be a change in control flow after the instruction is executed and the program is paused in step 420.

If the next instruction does not include a control flow condition that is a based on a variable in the CH set (as determined in step 414), the instruction is an assignment statement. The location of the CH set variable within the assignment statement needs to be determined. An assignment statement may be of the following form: Variable Receiving Assignment=Expression. For example, consider the assignment statement: A=10+B. In this example, the assignment operator is "=," the Variable Receiving Assignment is "A," and the Expression is "10+B." The Expression includes a constant and the variable "B." The steps shown in FIG. 4B refer to right and left sides of the assignment operator, where it should be understood that the Variable Receiving Assignment is on the left side of the assignment operator and the Expression is on the right side of the assignment operator. In step 422, the control flow split handler 210 may determine whether a variable in the CH set is on the right side of the assignment operator. In other words, it is determined in step 422 whether a variable in the CH set is in the Expression part of the assignment statement.

If a variable in the CH set is in the Expression part of the assignment statement, the variable on the left side of the statement is added to the CH set (step 424). In other words, the variable in the Variable Receiving Assignment part of the assignment statement is added to the CH set. The variable in the Variable Receiving Assignment part of the assignment statement may be referred to as being "sourced" from the variable in the Expression part of the assignment statement. For example, consider the instruction: result *=base, where base is a program variable in the CH set and result is a variable, but result is not in the CH set. (Note on syntax: result *=base means result=result+base.) Step 422 would determine that the instruction includes a variable from the CH set on the right side of the assignment operator (base) and step 424 would add the variable on the left side of the assignment operator (result) to the CH set. In this example, result is sourced from a variable in the CH set.

If a variable in the CH set is not in the Expression part of the assignment statement, a two part determination is made in step 426. First, it is determined whether the left side of the assignment statement includes a variable in the CH set. Second, it is determined whether the variable (or variables) on the right side of the assignment statement is not in the CH set. If both conditions are true, the variable on the left side of the assignment statement is removed from the CH set in step 428, and the process moves on to execute the instruction, i.e., to step 412. If one or both conditions are not true, then the process moves on to execute the instruction, i.e., to step 412. For example, consider the instruction: result *=9999, where result is a program variable in the CH set. Step 426 would determine that left side of the assignment statement includes a variable in the CH set (result). In addition, step 426 would determine that the right side of the assignment statement does not include a variable in the CH set, as 9999 is a constant. The process 400 would flow from step 426 to step 428. The variable on the left side (base) would be removed from the CH set in step 428. As a second example, consider the instruction: result *=base, where result and base are program variables in the CH set. Step 426 would determine that left side of the assignment statement includes a variable (base) in the CH set. In addition, step 426 would determine that right side of the assignment statement includes a variable (result) in the CH set. The process 400 would flow to step 412 to execute the instruction.

Step 426 includes the two conditions for the following reason. If both conditions are true in step 426, the change in value of the variable in the Variable Receiving Assignment (left side) portion is not because of a variable in the CH set and the variable on the left side may be removed from the CH set.

FIG. 5 shows a simple example of a portion of computer program source code that may be displayed in the user interface 200. FIG. 6 shows a variation on this portion of code. The code example in FIGS. 5 and 6 are next used to further illustrate the process 400. In both figures, Line 2 indicates that this portion of program code includes the variables "base," "exp," "result," and "i."

Referring to FIG. 5, in a first example, the value of the variable exp is equal to 5 when the program reaches the instruction on line 3. Assume the program is paused on line 3 and that the programmer changes the value of exp from 5 to 7 (step 402). When the programmer chooses a "run into flow split" option in the debugger 208, the original and changed values of the variable exp are added to the changed variable file 212 (i.e., the CH set) in step 404.

The next instruction is on line 4: "for (int i=0; i<exp; i++) {". (Note on syntax: The format of this for loop is: for (initialization; condition; increase) statement. If the condition is true, the statement is executed; if false, the loop ends and the statement is skipped.) Because the instruction includes exp, it is determined that the instruction includes a variable in the CH set in step 410. Further, because the instruction includes a control flow condition, step 416 is performed after step 414. The condition "i<exp" is evaluated using the original and new values of exp in step 416 and it is determined that the condition evaluates the same way for both versions of the variable in step 418. Accordingly, there is no change in control flow when the instruction is evaluated for the initial value of i. The instruction is executed in step 412 and the next instruction that is fetched is line 5 in the body of the loop.

Before leaving this example, consider that each time the instruction is on line 4 is evaluated the value of "i" will be incremented and compared with the value of the variable exp. When i=5, the condition no longer evaluates the same way for both versions of the variable exp. The condition "i<exp" evaluates false for the original value (5) of the variable, but evaluates true for the new value (7) of the variable. Accordingly, there will be a change in control flow after the instruction is executed and the program will be paused in step 420.

Still referring to FIG. 5, in a second example, the value of the variable base is equal to 10 when the program reaches the instruction on line 3. Assume the program is paused on line 3 and that the programmer changes the value of base from 10 to 1000 (step 402). The original and changed values of the variable base are added to the changed variable file 212 (i.e., the CH set) in step 404. Note that in this example at this point base is the only variable in CH set.

The instruction on line 5 is an unconditional assignment statement: "result *=base." The variable base is in the CH set, but the instruction does not include a control flow condition. Accordingly, it is determined that the instruction includes a variable in the CH set (step 410) and that the instruction does not include a control flow condition (step 414). In step 422, it is determined that there is a variable (base) that is from the CH set on the right side (Expression) of the assignment operator. Based on the determination in step 422, the variable on the left side (result) is added to the CH set in step 424 (if it is not already in the CH set as is the case in this example).

From step 424, the process 400 moves to step 412 where the instruction is executed. When the instruction "result *=base" is executed, it is executed for the old and new values base=10 and base=1000. In addition, the variable result is now in the CH set so result is updated for the old and new values. Each time the loop on lines 4-6 is evaluated, result is updated using the old and new values of base. When i is no longer less than exp, the next statement will be the instruction on line 7. When control exits the loop on lines 4-6, the old value of result will be 100,000 and the new value of result will be 10,000,000.

Step 410 determines that the instruction on line 7, "if (result>1000000) 1", includes a variable (result) in the CH set. Step 414 determines that the instruction on line 7 includes a control flow condition based on a variable in the CH set. Step 416 evaluates the condition for the old value of result (100,000) and the new value of result (10,000,000). The former is less than 1,000,000 while the later is greater than 1,000,000. Accordingly, the condition does not evaluate the same way for both versions of the variable result. Thus, there will be a change in control flow after the instruction on line 7 is executed and the program will be paused in step 420.

A third example is now described with reference to FIG. 6. The third example involves the same variable change as the second example. The value of the variable base is equal to 10 when the program reaches the instruction on line 3, the program is paused, and the programmer changes the value of base from 10 to 1000 in step 402. The original and changed values of the variable base are added to the changed variable file 212 (i.e., the CH set) in step 404. In addition, the variable result is added to the CH set in step 424 as described in the second example. Further, when control exits the loop on lines 4-6, the old value of result will be 100,000 and the new value of result will be 10,000,000, also as described in the second example.

In the third example shown in FIG. 6, after the loop the next instruction on line 7 is "result=9999." Step 410 determines that this step includes a variable (result) in the CH set. Step 414 determines that the instruction does not include a flow control condition. Step 422 determines the instruction does not include a variable from the CH set on the right side (Expression) of the assignment operator. The Expression is the constant: 9999. Step 426 determines that the variable (result) on the left side of the assignment operator is in the CH set. In addition, step 426 determines that the right side of the assignment operator does not have a variable that is in the CH set. Accordingly, the process 400 flows to step 428. In step 428, the variable (result) on the left side of the assignment operator is removed from the CH set. The instruction on line 7 is executed in step 412 and the next instruction if fetched in step 408.

The next instruction is line 8: "if (result>1000000) 1." In this third example, step 410 determines that the instruction on line 8 does not include a variable in the CH set. The variable result is not longer in the CH set at this point. While line 8 includes a control flow condition, any change in control flow is not caused directly or indirectly by a variable that was changed in step 402.

Figure 7:
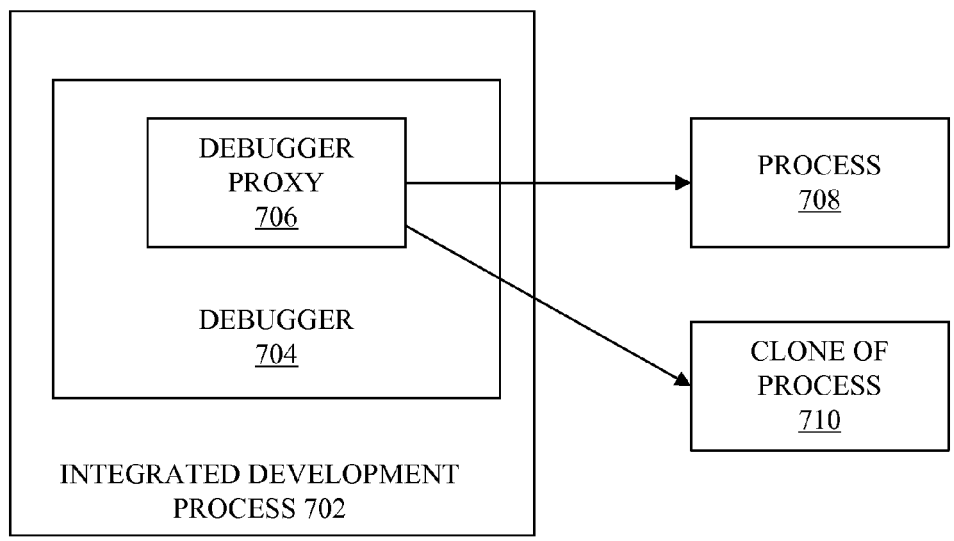
FIG. 7 is a schematic block diagram illustrating an integrated development environment for producing executable computer programming code according to various alternative embodiments.

FIG. 7 shows an alternative embodiment that includes an IDE 702. The IDE 702 may be similar to the IDE 154. The IDE 702 includes a debugger 704, which may be similar to the debugger 208, however, the debugger 708 additionally includes a debugger proxy 706. In this alternative, the computer program running under the control of the debugger 704 is depicted as process 708. In addition, at the same time that the computer program is being run under the control of the debugger 704 a copy of the computer program is also executed. This copy is depicted in the figure as clone of the process 710. The difference between the cloned process 710 and the process 708 is that the clone 710 may have original values of one or more variables and the process 708 may have values of one or more variables as changed by a programmer. The debugger proxy 706 maintains the clone 710. In one embodiment, the clone 710 may be created using Java Virtual Machine process cloning and Terracotta clustering.

The process for determining a location in a computer program where control flow diverges based on different values of a variable is similar to the processes 300 and 400. For example, a breakpoint is set at the same location in the computer program and the copy of the computer program. The process 708 and clone 710 run until the instruction associated with the breakpoint is reached. The process 708 and clone 710 each pause when the breakpoint is reached. While the two processes are paused, a variable is changed in one process but not the other. A CH set may be created. (Alternatively, two or more variables may be changed in one process but not the other.) Flow split monitoring is invoked. Both processes resume running under the control of the debugger 704. The process 708 and clone 710 are executed from this point using an automated flow split monitoring process in accordance with the principles disclosed in this disclosure. In an embodiment, instructions in the process 708 and clone 710 may execute synchronously. Before an instruction is executed it is evaluated in process 708 and clone 710 as described in process 400. If the same instructions in the respective processes do not evaluate in the same way (i.e., equivalently), a location in the code is found where control flow diverges based on different values for the variable (or variables). Both of the processes are automatically paused at the instruction before the control flow split according to various embodiments.

In various embodiments, the programmer may define start and end lines in the source code version of the process 708 and the cloned process 710. Both processes are run under the control of the debugger 704. When the defined portions of code are reached, the debugger executes the process 708 and the cloned process 710 step-by-step and records any desired differences between the two processes, such as differences in variable values, control flow, or other desired parameters. The debugger 704 renders in a user interface variable values for each of the process 708 and the cloned process 710. For example, the respective variable values for the process 708 and the cloned process 710 may be displayed side-by-side in separate columns, along with identifications of locations in the source code corresponding with variable values.

Another embodiment is directed to a distributed application. A distributed application may be one that uses remote services or databases, or both. In this context, the change of a variable during debugging may affect not only the application running under the control of the debugger, but may affect the remote services or databases as well. In an embodiment, the whole machine, i.e., the application together with any remote services and database it uses is cloned. This embodiment is similar to that depicted in FIG. 7, except process 708 and cloned process 710 are replaced with a whole machine and a clone of the whole machine.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used. The computer readable medium may be a computer-readable signal medium or a computer-readable storage medium. The computer readable signal medium or a computer readable storage medium may be a non-transitory medium in an embodiment. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire, optical fiber cable, RF, etc., or any suitable combination of the foregoing.

Computer program code for carrying out operations for aspects may be written in any combination of one or more programming languages, including an object-oriented programming language such as Java, Smalltalk, C++ or the like and conventional procedural programming languages, such as the C programming language or similar programming languages. The program code may execute entirely on the user's computer, partly on the user's computer, as a stand-alone software package, or on one module or on two or more modules of a storage system. The program code may execute partly on a user's computer or one module and partly on a remote computer or another module, or entirely on the remote computer or server or other module. In the latter scenario, the remote computer other module may be connected to the user's computer through any type of network, including a local area network (LAN) or a wide area network (WAN), or the connection may be made to an external computer (for example, through the Internet using an Internet Service Provider).

Aspects are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart, or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions or acts specified in the flowchart, or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While this disclosure has described the details of various embodiments shown in the drawings, these details are not intended to limit the scope of the invention as claimed in the appended claims.

The invention claimed is:

1. A method for analyzing a computer program, comprising:
   receiving an instruction specifying a first variable of the program, the first variable having a first value at a first location during program execution, the instruction further specifying a second value for the first variable at the first location;
   determining that a second location during program execution includes a conditional control flow instruction that includes the first variable;
   evaluating the conditional control flow instruction using the first and second values of the first variable at the second location; and
   determining whether control flow diverges at the second location based on the evaluating of the conditional control flow instruction using the first and second values at the second location.

2. The method of claim 1, wherein the determining that a second location during program execution includes a conditional control flow instruction that includes the first variable, further includes:
   determining that the conditional control flow instruction includes the first variable or a second variable sourced from the first variable.

3. The method of claim 2, further comprising:
   evaluating the conditional control flow instruction using values of the second variable at the second location corresponding with the first and second values of the first variable; and
   determining that control flow diverges at the second location based on the evaluating of the conditional control flow instruction using the values of the second variable at the second location corresponding with the first and second values of the first variable.

4. The method of claim 3, further comprising:
determining that a third location during program execution includes an assignment instruction that includes a variable receiving the assignment and an expression, and
determining that the second variable is sourced from the first variable based on a determination that the expression includes the first variable and the variable receiving the assignment is the second variable.

5. The method of claim 3, further comprising:
determining that a third location during program execution includes an assignment instruction that includes a variable receiving the assignment and an expression, and
determining that the second variable is not sourced from the first variable based on a determination that the expression excludes the first variable and the variable receiving the assignment is the second variable.

6. The method of claim 1, wherein the determining that a second location during program execution includes a conditional control flow instruction includes executing the program, and further comprising pausing the executing of the program in response to the determining that control flow diverges at the second location.

7. The method of claim 1, wherein the first location is associated with a breakpoint.

8. The method of claim 1, wherein the instruction specifying the first variable of the program, the first variable having the first value at the first location during program execution, the instruction further specifying the second value for the first variable, further includes:
specifying a second variable of the program, the second variable having a third value at the first location during program execution, the instruction further specifying a fourth value for the second variable.

9. A method for analyzing a computer program, comprising:
receiving an instruction specifying a first variable of the program, the first variable having a first value at a first location during program execution, the instruction further specifying a second value for the first variable at the first location;
executing a first instance of the computer program from the first location using the first value of the first variable;
executing a second instance of the computer program from the first location using the second value of the first variable;
determining that a second location during program execution includes a conditional control flow instruction that includes the first variable;
determining whether the conditional control flow instruction of the first and second instances are evaluated equivalently by the first and second instances of the computer program; and
determining that control flow diverges at the second location based on the determining of whether the conditional control flow instructions are evaluated equivalently by the first and second instances of the computer program.

10. The method of claim 9, further comprising pausing the executing of the program instances in response to the determining that control flow diverges at the second location.

11. A computer program product for processing a stream of tuples, the computer program product comprising a computer readable storage medium having program code embodied therewith, the program code comprising computer readable program code configured for:
receiving an instruction specifying a first variable of the program, the first variable having a first value at a first location during program execution, the instruction further specifying a second value for the first variable at the first location;
determining that a second location during program execution includes a conditional control flow instruction that includes the first variable;
evaluating the conditional control flow instruction using the first and second values of the first variable at the second location; and
determining whether control flow diverges at the second location based on the evaluating of the conditional control flow instruction using the first and second values at the second location.

12. The computer program product of claim 11, wherein the determining that a second location during program execution includes a conditional control flow instruction that includes the first variable, further includes:
determining that the conditional control flow instruction includes the first variable or a second variable sourced from the first variable.

13. The computer program product of claim 12, further comprising:
evaluating the conditional control flow instruction using values of the second variable at the second location corresponding with the first and second values of the first variable; and
determining that control flow diverges at the second location based on the evaluating of the conditional control flow instruction using the values of the second variable at the second location corresponding with the first and second values of the first variable.

14. The computer program product of claim 13, further comprising:
determining that a third location during program execution includes an assignment instruction that includes a variable receiving the assignment and an expression, and
determining that the second variable is sourced from the first variable based on a determination that the expression includes the first variable and the variable receiving the assignment is the second variable.

15. The computer program product of claim 13, further comprising:
determining that a third location during program execution includes an assignment instruction that includes a variable receiving the assignment and an expression, and
determining that the second variable is not sourced from the first variable based on a determination that the expression excludes the first variable and the variable receiving the assignment is the second variable.

16. The computer program product of claim 11, wherein the determining that a second location during program execution includes a conditional control flow instruction includes executing the program, and further comprising pausing the executing of the program in response to the determining that control flow diverges at the second location.

17. The computer program product of claim 11, wherein the first location is associated with a breakpoint.

18. The computer program product of claim 11, wherein the instruction specifying the first variable of the program, the first variable having the first value at the first location during program execution, the instruction further specifying the second value for the first variable, further includes:
specifying a second variable of the program, the second variable having a third value at the first location during program execution, the instruction further specifying a fourth value for the second variable.

* * * * *